(12) United States Patent
Curtis

(10) Patent No.: US 6,934,761 B1
(45) Date of Patent: Aug. 23, 2005

(54) USER LEVEL WEB SERVER CACHE CONTROL OF IN-KERNEL HTTP CACHE

(75) Inventor: Bruce W. Curtis, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/513,328

(22) Filed: Feb. 25, 2000

(51) Int. Cl.[7] .............................. G06F 15/16; G06F 3/00
(52) U.S. Cl. ...................... 709/237; 719/328; 719/330
(58) Field of Search .................... 709/203, 216–219, 709/229, 237; 711/3, 118, 124–125, 133; 345/557; 719/328, 330

(56) References Cited

U.S. PATENT DOCUMENTS

| | | | |
|---|---|---|---|
| 5,630,166 A * | 5/1997 | Gamache et al. ............... 712/9 |
| 5,659,757 A | 8/1997 | Browning et al. |
| 5,805,809 A * | 9/1998 | Singh et al. .................. 709/203 |
| 5,819,091 A | 10/1998 | Arendt et al. |
| 5,832,222 A | 11/1998 | Dziadosz et al. |
| 5,835,724 A | 11/1998 | Smith |
| 5,852,717 A | 12/1998 | Bhide et al. |
| 5,951,694 A | 9/1999 | Choquier et al. ............. 714/15 |
| 5,968,127 A | 10/1999 | Kawabe et al. ............. 709/226 |
| 5,991,802 A | 11/1999 | Allard et al. |
| 6,012,090 A | 1/2000 | Chung et al. |
| 6,073,212 A * | 6/2000 | Hayes et al. ................ 711/122 |
| 6,115,712 A | 9/2000 | Islam et al. |
| 6,131,122 A | 10/2000 | Sampson .................... 709/227 |
| 6,138,162 A | 10/2000 | Pistriotto et al. ............ 709/229 |
| 6,163,812 A * | 12/2000 | Gopal et al. ................. 719/310 |
| 6,170,018 B1 * | 1/2001 | Voll et al. ................... 709/304 |
| 6,192,398 B1 * | 2/2001 | Hunt ........................ 709/213 |
| 6,216,173 B1 | 4/2001 | Jones et al. |
| 6,223,204 B1 | 4/2001 | Tucker |

(Continued)

FOREIGN PATENT DOCUMENTS

EP 1191438 * 3/2002 .............. G06F 9/46

OTHER PUBLICATIONS

Efficient User-Level File Cache Managment on the Sun Vnode Interface, Steere et. al., Carnegie Mellon Univ., Apr. 1990, pp. 1-15.*

(Continued)

*Primary Examiner*—Beatriz Prieto
(74) *Attorney, Agent, or Firm*—Beyer Weaver & Thomas LLP

(57) ABSTRACT

Methods and apparatus for managing a HTTP cache in a web server. A HTTP daemon in a web server may provide response data as well as one or more cache control indicators to a cache manager. The cache control indicators are adapted for managing information that is stored in the HTTP cache and/or controlling transmission of the response data. When the cache manager receives the response data and the cache control indicators from the HTTP daemon, the cache manager can modify the information stored in the HTTP cache as well as control the transmission of the response data in accordance with the cache control indicators.

10 Claims, 14 Drawing Sheets

U.S. PATENT DOCUMENTS

| | | | |
|---|---|---|---|
| 6,260,120 B1 * | 7/2001 | Blumenau et al. | 711/152 |
| 6,292,835 B1 * | 9/2001 | Huang et al. | 709/235 |
| 6,321,181 B1 | 11/2001 | Havens | 703/13 |
| 6,334,142 B1 | 12/2001 | Newton et al. | 709/206 |
| 6,374,305 B1 | 4/2002 | Gupta et al. | 709/246 |
| 6,377,984 B1 | 4/2002 | Najork et al. | 709/217 |
| 6,389,462 B1 | 5/2002 | Cohen et al. | 709/218 |
| 6,411,998 B1 | 6/2002 | Bryant et al. | |
| 6,418,544 B1 | 7/2002 | Nesbitt et al. | 714/43 |
| 6,421,675 B1 | 7/2002 | Ryan et al. | |
| 6,611,873 B1 | 8/2003 | Kanehara | 709/238 |

OTHER PUBLICATIONS

A network file system over HTTP remote access and modification of files and files, Kiselyov, O., USENIX Jun. 1999, pp. 1-7.*

USENIX: Porting the Coda File System to Windows, Braam, P. et. al., Jun. 1999, pp. 1-7.*

Implementation and Performance of Integrated Application-Controlled File Caching, Prefetching and Disk Scheduling, Cao, P. et al., Princeton Univ., Nov. 1996, ACM 0734-2071/96/1100-0311, pp. 311-343.*

WEBFS: A fil system interface to the World Wide Web, Muthukrishnan, S.; Kulkarni, S., Univ. of Winsconsin, Dec. 1999, pp. 1-21.*

Ahmed Helmy, *Protocol Independent Multicast-Sparse Mode (PIM-SM): Inmplementation Document*, University of Southern California, PIM-SM-implementation.ps, Jan. 19, 1997.

Robbert Van Renesse, et al., *Horus: A Flexible Group Communications System*, Dept. of Computer Science, Cornell University, http://www.cs.cornell.edu/Info/Projects/HORUS.

Tripathy, et al, "Web Server In-Kernel Interface to Data Transport System and Cache Manager," U.S. Appl. No. 09/654,103, Filed Aug. 31, 2000, 36 Pages.

Bruce W. Curtis, "User Level Web Server In-Kernel I/O Accelerator," U.S. Appl. No. 09/513,320, Filed Feb. 25, 2000. 46 Pages.

"Solaris Network Cache and Accelerator" Hejazi Homepage, Online, May 2000, XP002274654 Retrieved from the Internet: URL:http://www.hejazi.org/solaris/snca/snca-wp.pdf> retrieved on Mar. 22, 2004.

Duane Wessels, Squid Developers: "Squid Programmers Guide" Squid Cache Homepage, Online, Jan. 17, 2000, XP002274655 Retrieved from the Internet: URL:http://web.archive.org/web/20001001011744/www.squid-cache.org/Doc/Prog-Guide/prog-guide-2.html> retrieved on Mar. 22, 2004.

Richard W. Stevens, "UNIX Network Programming," 1999, Prentice Hall Ptr, Upper Saddle River, NJ 07458, USA, XP002274657.

"System Administration Guide," Livingston Observatory Homepage, Online, Feb. 2000, XP002274656 Retrieved from the Internet: URL:http://www.ligo-la.caltech.edu/{support/806-0916.pdf> retrieved on 20004-03-22.

* cited by examiner

USER LEVEL WEB SERVER CACHE CONTROL OF IN-KERNEL HTTP CACHE

CROSS REFERENCE TO RELATED APPLICATIONS

This invention is related to U.S. patent application Ser. No. 09/513,320 filed on Feb. 25, 2000, naming Bruce W. Curtis as inventor, a and entitled "USER LEVEL WEB SERVER IN-KERNEL NETWORK I/O ACCELERATOR". That application is incorporated herein by reference in its entirety and for all purposes.

BACKGROUND OF THE INVENTION

1. Field of the Invention

The present invention relates generally to computer software. More particularly, the present invention relates to methods and apparatus for enabling a web server to control an in-kernel HTTP cache.

2. Description of Related Art

FIG. 1 is a block diagram illustrating a conventional web server 104. Through the use of a web browser and the web server 104, a user may access a web page on the Internet. In this manner, multiple Hypertext Transfer Protocol (HTTP) clients (e.g., web browsers) 100, 102 may access files via the single web server 104. Typically, a browser user enters HTTP file requests by either "opening" a Web file (e.g., typing in a Uniform Resource Locator or URL) or clicking on a hypertext link. The browser builds a HTTP request and sends it to the Internet Protocol (IP) address indicated by the URL. When the web browser 100 or 102 sends a HTTP request to the web server 104 identified by the IP address, the web server 104 receives the request and, after any necessary processing, the requested file (i.e., HTTP response data) is returned.

Within the web server 104, HTTP requests that are received are processed by a HTTP daemon 105. The HTTP daemon 105 is a program that runs continuously and exists for the purpose of handling HTTP requests. The HTTP daemon 105 forwards the HTTP requests to other programs or processes as appropriate. Thus, each web server has a HTTP daemon 105 that continually waits for requests to come in from Web clients and their users. Once a file (i.e., HTTP response data) is obtained (e.g., from an associated memory 106), the data is transmitted to the client 100 or 102 that requested the data.

HTTP requests are typically initially handled by a kernel 107 that is responsible for forwarding the requests from the client 100 or 102 to the HTTP daemon 105. The kernel 107 is the essential center of a computer operating system, the core that provides basic services for all other parts of the operating system. Typically, a kernel includes an interrupt handler that handles all requests or completed I/O operations that compete for the kernel's services, a scheduler that determines which programs share the kernel's processing time in what order, and a supervisor that actually gives use of the computer to each process when it is scheduled. The kernel 107 may also include a manager of the operating system's address spaces in memory, sharing these among all components and other users of the kernel's services. A kernel's services are requested by other parts of the operating system or by applications through a specified set of program interfaces sometimes known as system calls. The kernel 107 provides services such as buffer management, message routing, and standardized interfaces to protocols which enable data to be routed between a client and a server.

The kernel structure consists of three layers: a socket layer 108, a protocol layer 110, and a device layer 111. The socket layer 108 supplies the interface between the HTTP daemon 105 and lower layers, the protocol layer 110 contains protocol modules for communication, and the device layer 111 contains device drivers that control network devices. Thus, a server and client process may communicate with one another through the socket layer 108.

Conventional Unix network input/output is provided through the use of a file descriptor opened on a socket. A file descriptor is typically an integer that identifies an open file within a process which is obtained as a result of opening the file. In other words, a separate socket is required for each network connection. Thus, as shown, each network connection corresponding to a client has an associated socket layer 112 and protocol layer 114, which may send data via a network interface card 116 via a transmission medium 118 to one or more clients 100, 102. Each socket has its own socket data structure. Since a separate file descriptor is opened on a socket for each network connection, in-kernel resources are unnecessarily consumed. Moreover, there are limits to the number of file descriptors that may be opened at a particular instant in time.

While a web server cache 106 has been implemented to store HTTP response data, the cache 106 has been controlled in an unsophisticated manner. Thus, it has not been possible for a HTTP daemon processing HTTP requests to predict if a data object is likely to be accessed in the future and therefore indicate whether the data object should be cached in an in-kernel cache. Similarly, it would be desirable to obtain permission by the HTTP daemon prior to use of an in-kernel cached data object for the purpose of access control of that data by a client sending a HTTP request.

In view of the above, it would be desirable to enable a web server to control an in-kernel cache with a minimum of memory and processing resources. In addition, it would be preferable if such a system could be implemented on a Unix network.

SUMMARY

The present invention provides methods and apparatus for managing a HTTP cache and the transmission of HTTP response data in a web server. Through the transmission of one or more cache control indicators between a HTTP daemon and a cache manager managing an in-kernel HTTP cache, the information that is stored in the HTTP cache may be controlled. In addition, the transmission of response data to a client sending a HTTP request may be monitored and controlled in accordance with one or more of the cache control indicators.

In accordance with one embodiment, the cache control indicators may be used to control information that is stored in the in-kernel HTTP cache as well as the information that is transmitted to a client. An advisory state may be used to indicate that the cache manager must obtain permission from the HTTP daemon prior to transmitting a HTTP response to a client. For instance, the advisory state may be stored along with response data in the cache. When time sensitive information such as stock information is stored, it may be desirable to obtain permission from the HTTP daemon to transmit this potentially outdated information. When permission is requested from the HTTP daemon, the HTTP daemon may return a cache advise state to control information that is stored in the HTTP cache as well as the information that is transmitted to a client. For instance, when the cache advise state is NONE, the cache manager may transmit response data (e.g., stored in the HTTP cache). As another example, when the cache advise state is REPLACE, a specified set of data in the HTTP cache is to be replaced with a second set of data. As yet another example, when the cache advise state is FLUSH, this indicates to the cache manager that a set of data in the HTTP cache is to be flushed from the cache. As another example, the HTTP daemon may set the advise state to TEMP to communicate to the cache manager that the response data is temporary and therefore is to be transmitted to the client and not stored in the HTTP cache. Finally, a cache state may be used to indicate whether the response data is to be cached by the cache manager.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

In the following described embodiment, the Solaris Doors API is used to transfer the cache control directives between the HTTP daemon and the cache manager. However, the invention is not so limited and may be applicable to any appropriate mechanism (e.g., Remote Procedure Call mechanism) for communicating between an application and an in-kernel module. The Solaris™ Doors API is a Remote Procedure Call (RPC) mechanism which makes use of the Unix notion of the filesystem as a universal name space and has built in support for multi-threading. The fundamental building block of this RPC mechanism is the door, which can be thought of as an object upon which a thread can invoke a method. For instance, a "door_call" is used to invoke a method in a server process while a "door_return" is used to return values to the client process. However, the present invention need not be implemented on a Unix system and therefore need not be implemented using one or more doors. The present invention may be implemented on any system which includes an application and a kernel. For instance, the invention may be applicable to a system having a kernel and an application transport protocol layer (e.g., FTP) which is data intensive.

Figure 1:
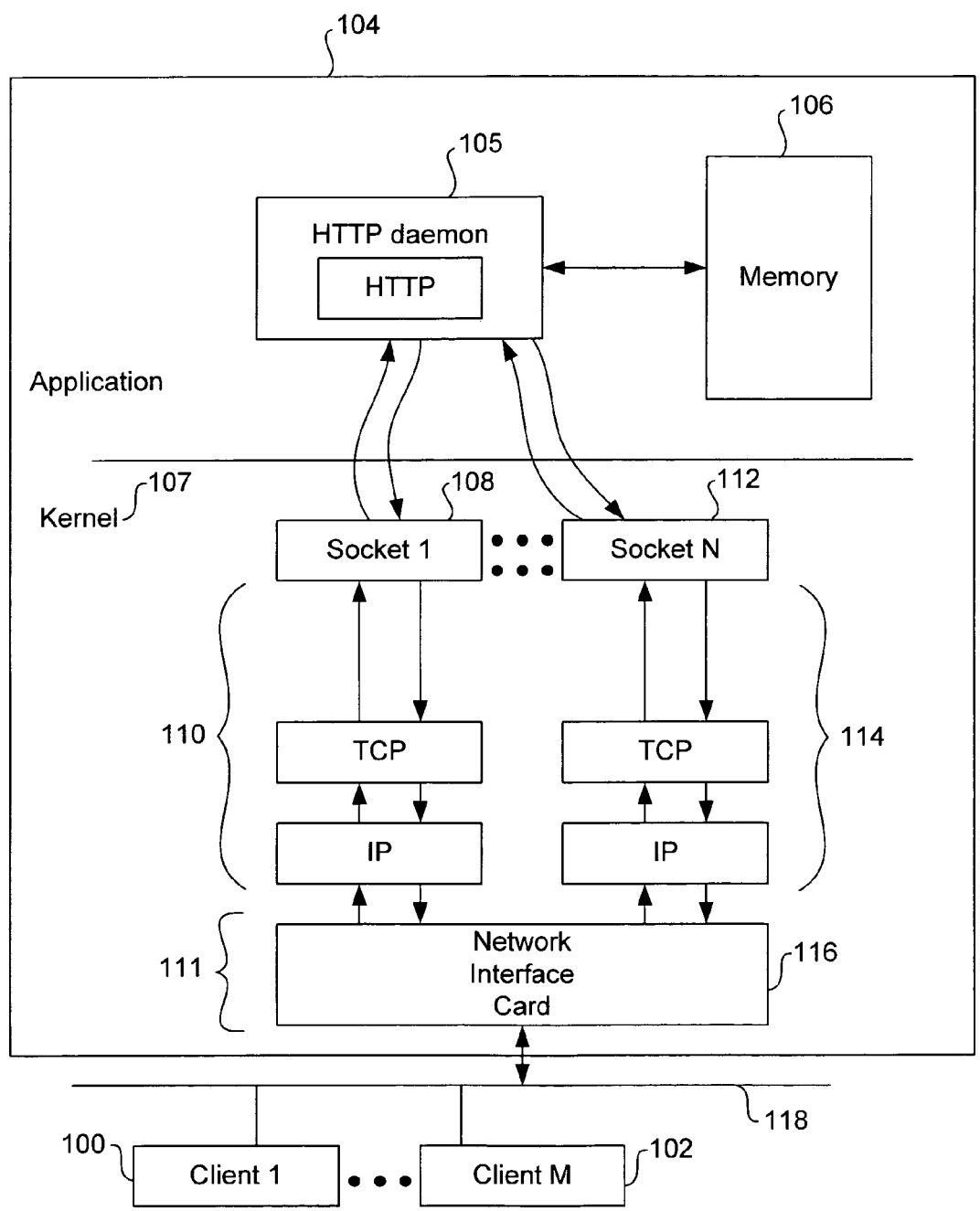
FIG. 1 is a block diagram illustrating a conventional web server.
Figure 2:
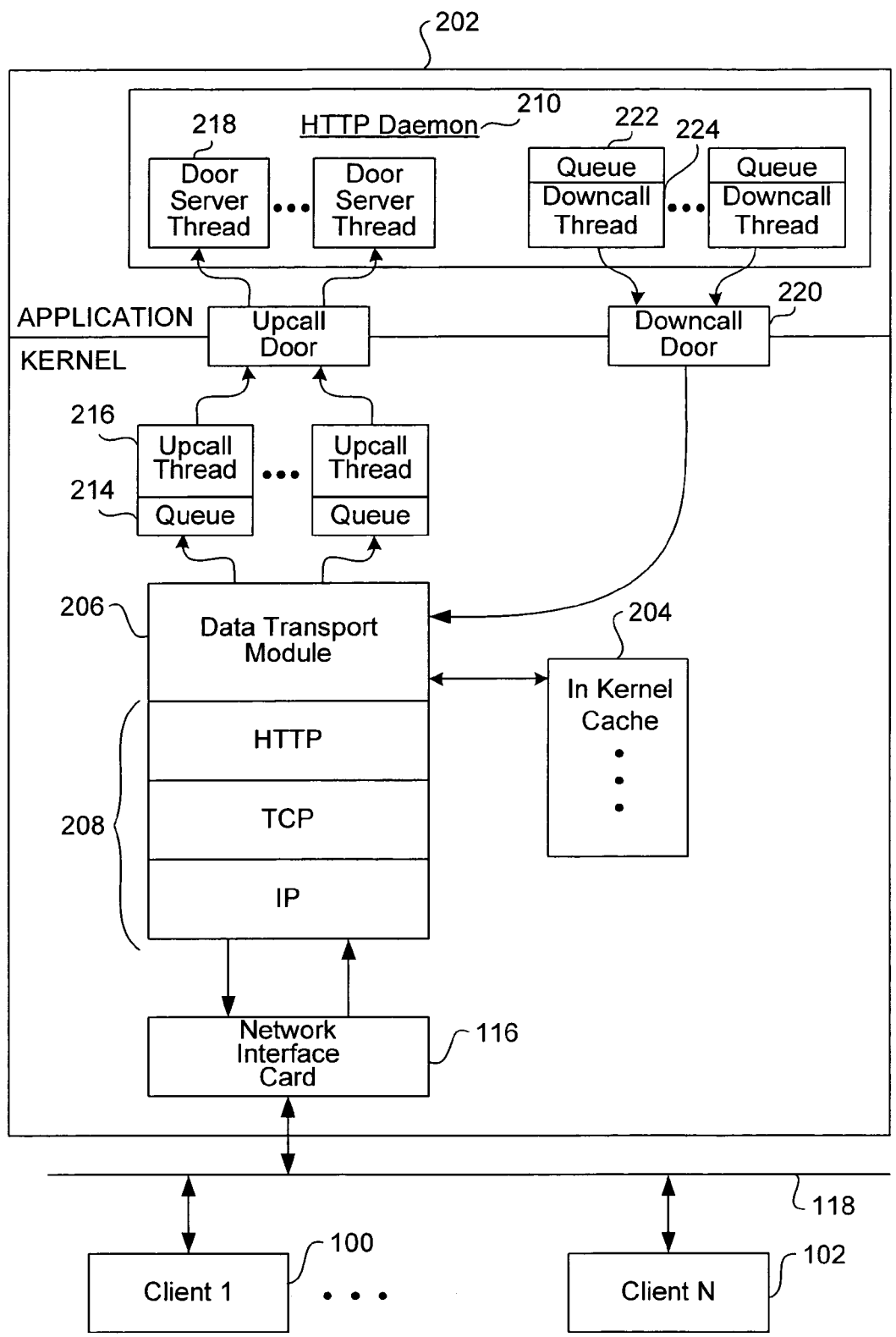
FIG. 2 is a block diagram illustrating a system in which an in-kernel cache manager is implemented in accordance with an embodiment of the invention.

FIG. 2 is a block diagram illustrating a system in which an in-kernel cache manager is implemented in accordance with an embodiment of the invention. As shown in FIG. 2, multiple clients 100, 102 may send HTTP requests to a web server 202. Within the web server, an in-kernel cache 204 is managed by a cache manager 206 having an associated protocol stack 208. The cache manager 206 routes HTTP requests or portions thereof (and/or other information or requests) to a HTTP daemon 210 via an upcall door 212. More particularly, the cache manager places an object (e.g., containing the HTTP request and/or other requests or information) in an upcall thread queue 214. An upcall thread 216 then obtains the HTTP request from the upcall thread queue 214 and invokes a method implemented by the HTTP daemon 210 as a door server thread 218. The HTTP daemon 210 may return a HTTP response (or portion thereof) and/or directives to control information that is stored in the in-kernel cache 204 or control the transmission of information to a client 100 or 102. This information is sent to the cache manager 206 via a downcall door 220. More particularly, the HTTP daemon 210 places an object containing the HTTP response and/or directives in a downcall thread queue 222. The object is later obtained from the downcall thread queue 222 by an associated downcall thread 224. The downcall thread 224 then sends this object to the cache manager 206 via the downcall door 220. The cache manager 206 may then obtain the HTTP response and/or directives from the object received via the downcall door 220 so that it may determine how to manage the transmission and/or storage of response data received from the HTTP daemon 210. In this manner, the HTTP daemon 210 may manage information that is stored, modified and/or purged from the in-kernel cache 204 as well as control information that is transmitted to the clients 100 and 102.

Figure 3:
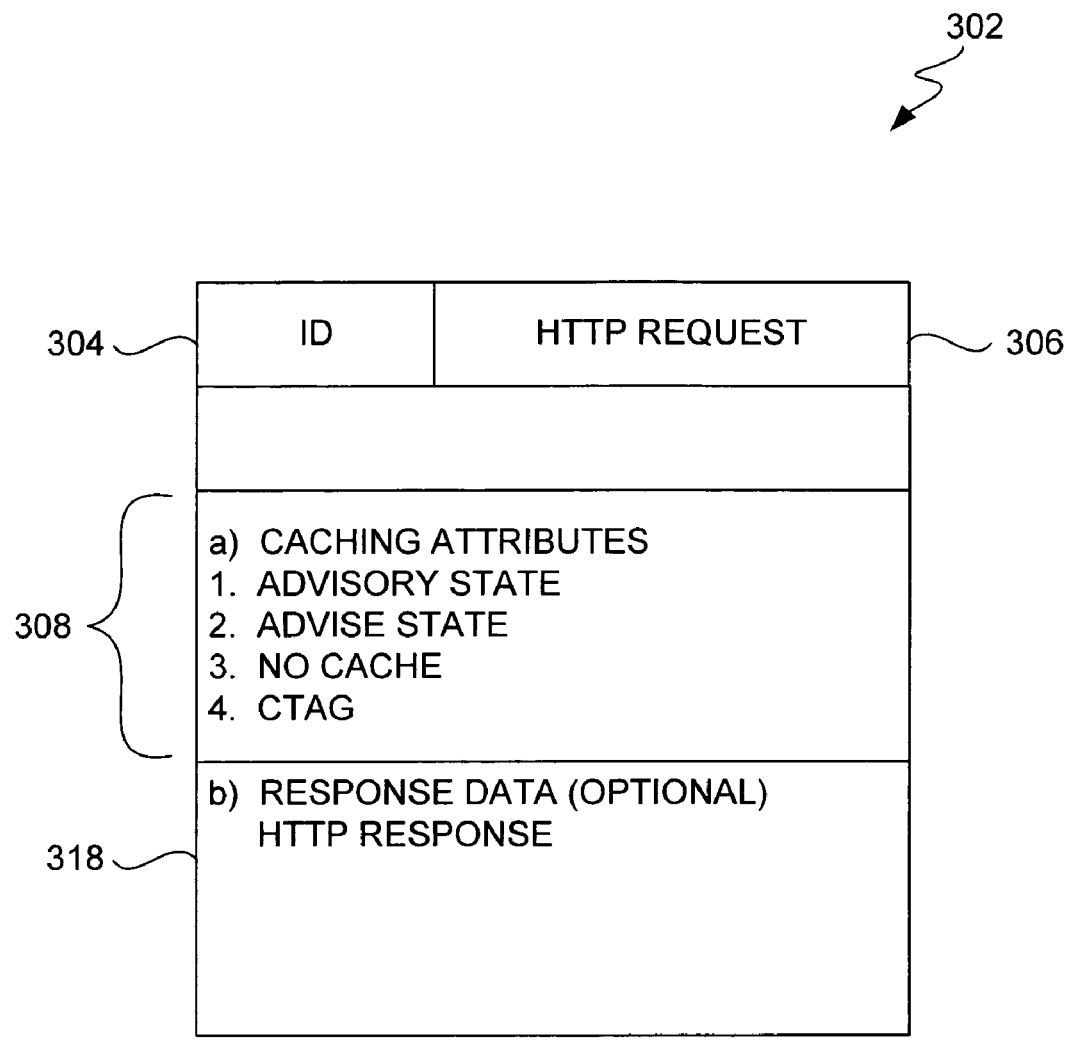
FIG. 3 is a block diagram illustrating a data type that may be transported in accordance with an embodiment of the invention.

As described above with reference to FIG. 2, the cache manager 206 and the HTTP daemon 210 communicate through sending an object. FIG. 3 is a block diagram illustrating an exemplary data type that may be transported in accordance with an embodiment of the invention. More particularly, in accordance with one embodiment, the cache manager and the HTTP daemon both transmit a HTTP request-response object. The information that may be provided in the HTTP request-response object is illustrated generally in FIG. 3. According to FIG. 3, HTTP request-response object 302 is shown to identify the data stream (e.g., through an identifier ID) 304 between the cache manager 206 and the HTTP daemon 210. In addition, a HTTP request field 306 stores the HTTP request. Caching attributes 308 (i.e., cache control indicators) may be provided in the HTTP request-response object 302 by the HTTP daemon in order to manage information that is stored in the HTTP cache as well as to control transmission of the response data. As shown, the set of exemplary caching attributes 308 includes an advisory state 310, a nocache state 312, a CTAG 314, and an advise state 316. The advisory state 310 indicates whether the cache manager 206 must communicate with the HTTP daemon 210 in order to determine whether response data can be transmitted to a client that has sent a HTTP request. In addition, the nocache state 312 indicates whether the HTTP response and associated data are to be stored in the in-kernel HTTP cache 204. The CTAG 314 is a unique identifier associated with a HTTP response that enables the response to be associated with multiple HTTP requests in the HTTP cache. The advise state 316 may be provided by the HTTP daemon 210 in response to a HTTP request from the cache manager 206 as well as independently without receiving a request from the cache manager 206. The advise state 316 indicates an action to be taken with the response data and may specify a variety of actions, including but not limited to, modifying, storing, or flushing data from the in-kernel HTTP cache as well as controlling the response data that is transmitted to a client that has submitted a HTTP request. Moreover, although the advise state 316 and the advisory state 310 are shown as separate states, they may be implemented as a single field. In addition, the HTTP daemon 210 may optionally provide response data 318 in the HTTP request-response object.

As described above with reference to FIG. 3, in one embodiment, the cache manager 206 and the HTTP daemon 210 exchange information through sending a HTTP request-response object in which the information is provided. Although the cache manager 206 and HTTP daemon 210 typically transmit the same type of object (e.g., HTTP request-response object), the cache manager 206 and the HTTP daemon 210 may transmit the information in a variety of formats. Accordingly, the HTTP request-response object is merely illustrative and other mechanisms for storing and transmitting data between the cache manager and the HTTP daemon are contemplated.

Figure 4:
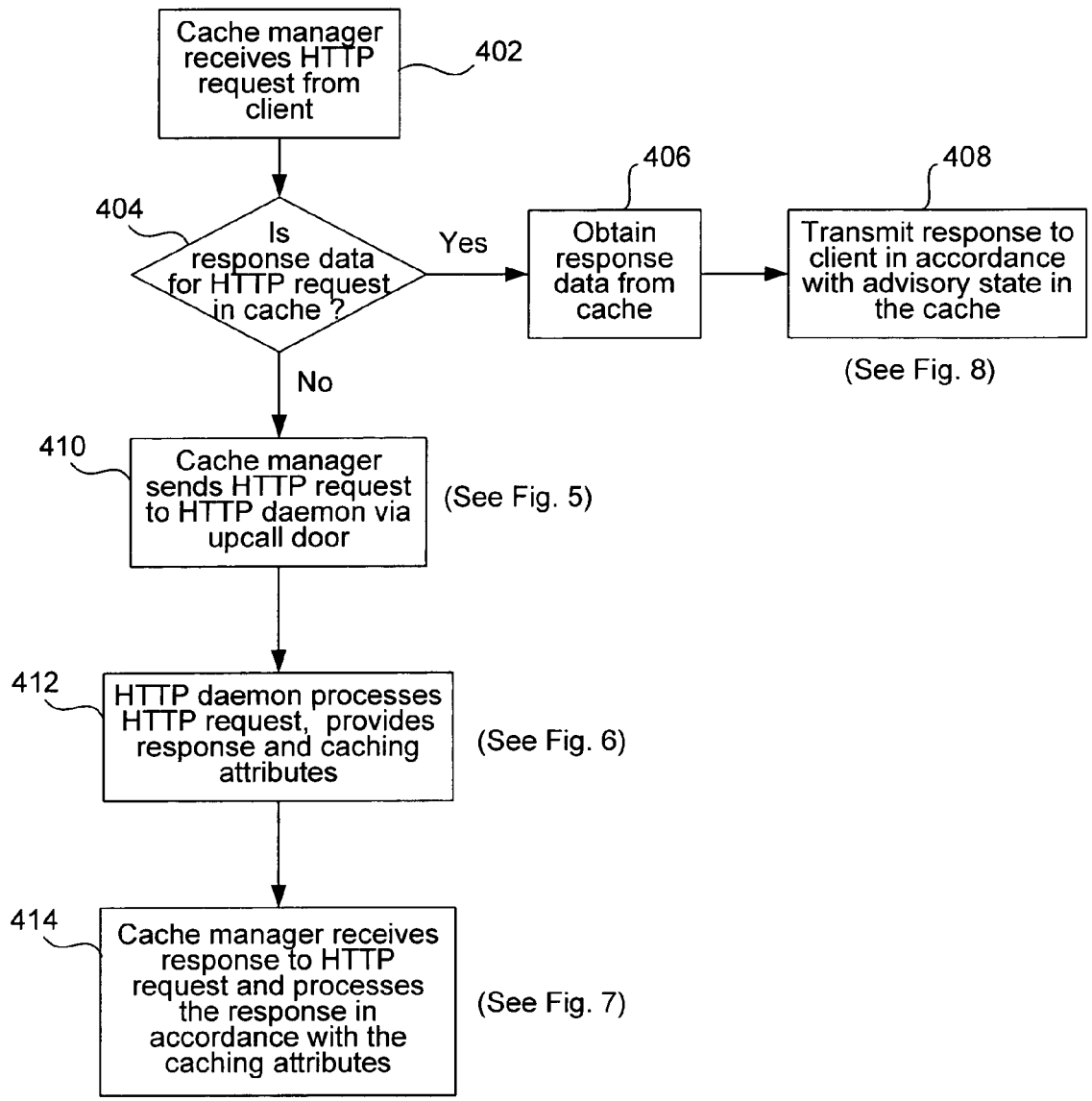
FIG. 4 is a process flow diagram illustrating a method of processing a HTTP request received from a client in accordance with an embodiment of the invention.

FIG. 4 is a process flow diagram illustrating a general method of processing a HTTP request received from a client in accordance with an embodiment of the invention. At block 402 a cache manager receives a HTTP request from a client. Next, at block 404 the cache manager determines whether response data associated with the HTTP request is stored in a HTTP cache (e.g., in-kernel cache). If the response data associated with the HTTP request is stored in the HTTP cache, the response data is obtained from the cache at block 406. The response data is then transmitted to the client sending the HTTP request in accordance with the caching attributes at block 408. More particularly, an advisory state associated with the HTTP request can be obtained from the cache in order to determine whether it is necessary to consult with the web server prior to transmitting the response data to the client. One method of transmitting the response data in accordance with an advisory state is described in further detail below with reference to FIG. 8.

When the response data associated with the HTTP request is determined at block 404 not to be in the cache, a cache miss has occurred. In this instance, the cache manager sends the HTTP request to a HTTP daemon at block 410. For instance, the HTTP request may be sent via a door such as that illustrated in FIG. 2. One method of sending the HTTP request via an upcall door will be described in further detail below with reference to FIG. 5. The HTTP daemon then processes the HTTP request, provides a HTTP response and one or more associated caching attributes at block 412. One method of providing a HTTP response and one or more associated caching attributes will be described in further detail below with reference to FIG. 6. At block 414 the cache manager receives the response to the HTTP request and processes the response in accordance with the caching attributes. One method of processing the response in accordance with the caching attributes is described in further detail below with reference to FIG. 7.

Figure 5:
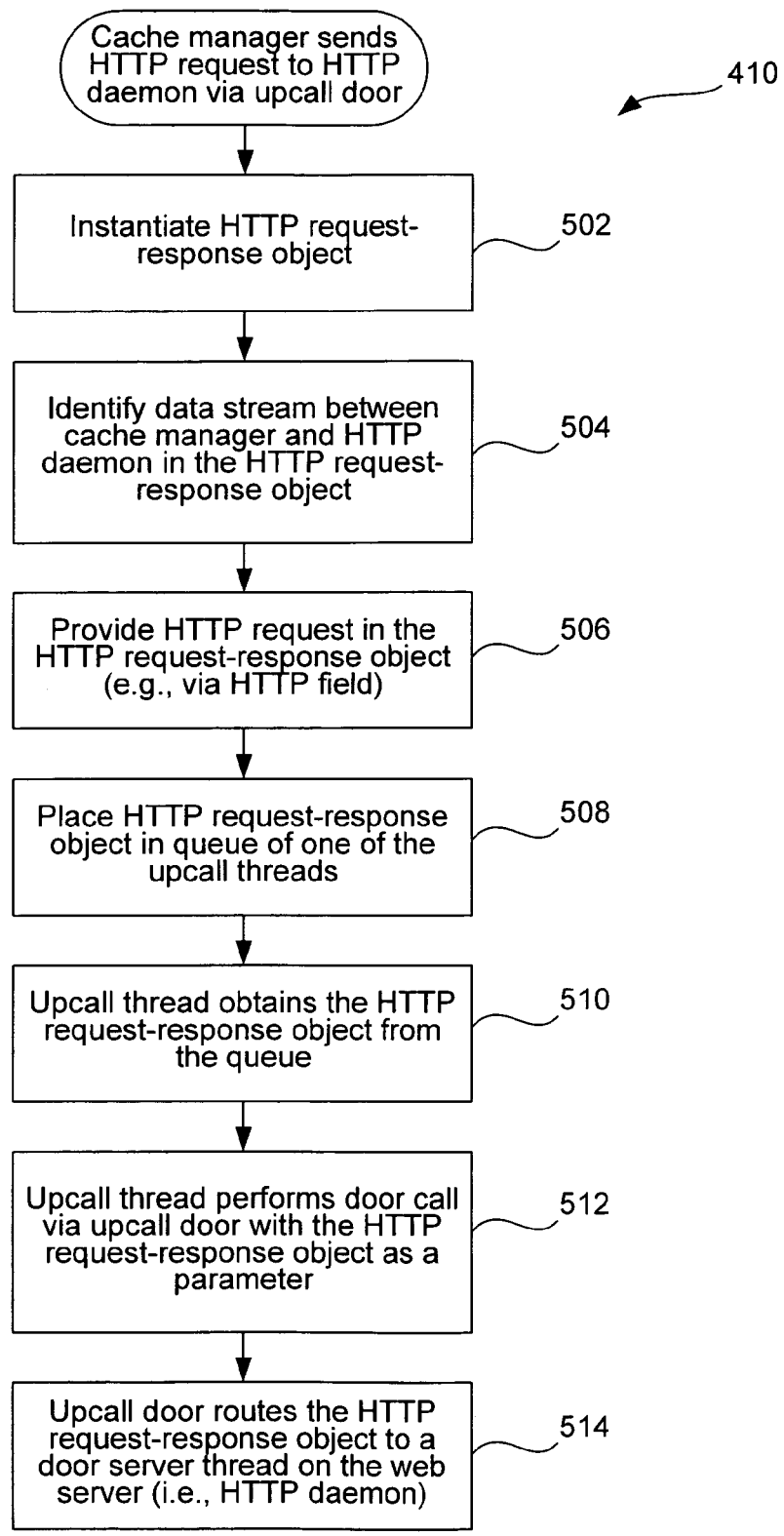
FIG. 5 is a process flow diagram illustrating a method of sending a HTTP request to a HTTP daemon as shown at block 410 of FIG. 4.

FIG. 5 is a process flow diagram illustrating a method of sending a HTTP request to a HTTP daemon as shown at block 410 of FIG. 4. The cache manager instantiates a HTTP request-response object at block 502 and identifies the data stream between the cache manager and the HTTP daemon as provided in the ID field 304 of the HTTP request-response object at block 504. The HTTP request is then provided in the HTTP field 306 of the HTTP request-response object at block 506. The HTTP request-response object is then placed in a queue of one of the upcall threads at block 508. The upcall thread then obtains a HTTP request-response object from the queue at block 510. The upcall thread performs a door call via an upcall door with the HTTP request-response object as a parameter at block 512. The upcall door then routes the HTTP request-response object to a door server thread on the web server (i.e., HTTP daemon) at block 514.

Figure 6:
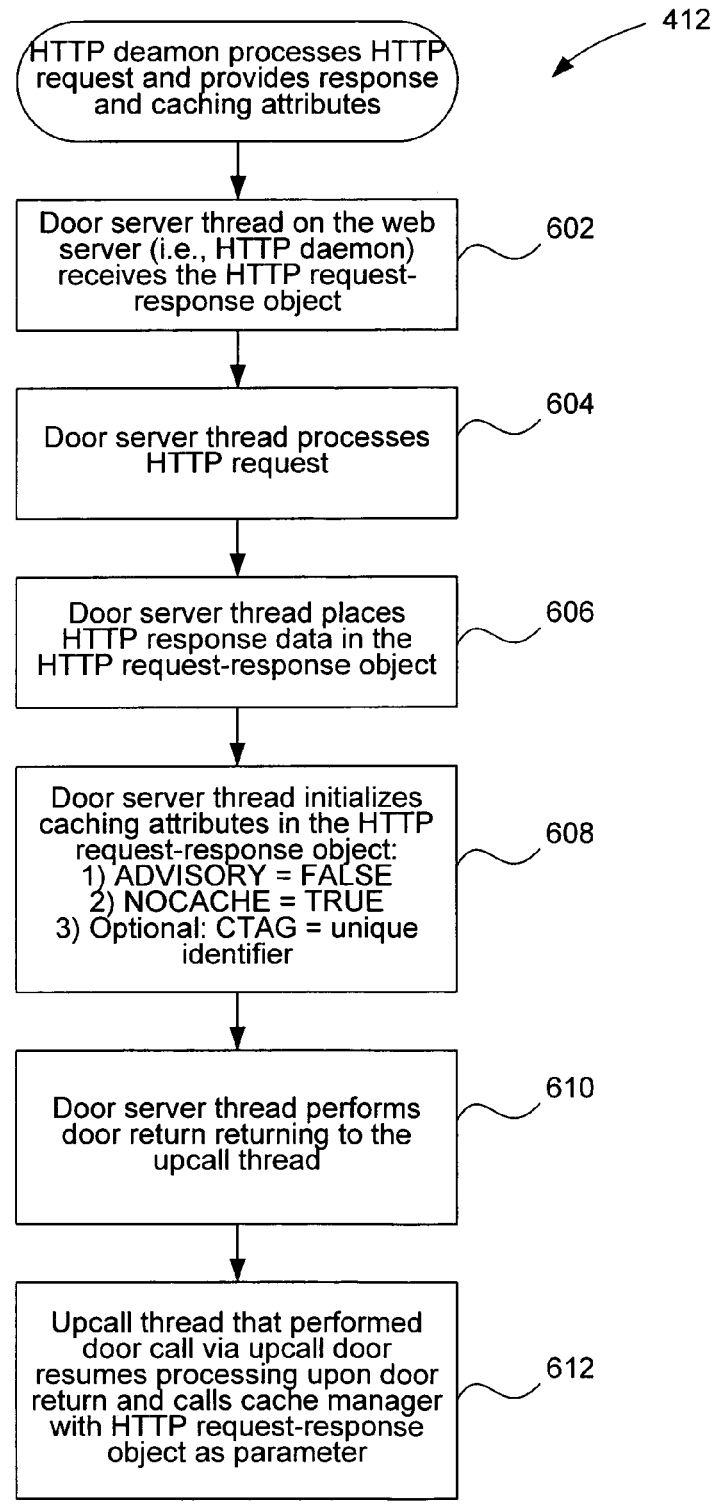
FIG. 6 is a process flow diagram illustrating a method of processing a HTTP request and providing a response as shown at block 412 of FIG. 4.

FIG. 6 is a process flow diagram illustrating a method of processing a HTTP request and providing a response as shown at block 412 of FIG. 4. The HTTP daemon (e.g., door server thread) receives the HTTP request response object at block 602 and the door server thread processes the HTTP request at block 604. The door server thread places any obtained response data in the HTTP response data field of the HTTP request-response object at block 606. The door server thread then initializes the caching attributes in the HTTP request-response object at block 608. More particularly, the caching attributes may include a CACHE/NO-CACHE state, an advisory state, and/or a CTAG state. The cache state indicates that the HTTP response is to be stored in the HTTP cache when in a first state and indicates that the HTTP response is not to be stored in the HTTP cache when in a second state. For instance, the nocache state may be initialized to TRUE indicating that the HTTP response is not to be cached. In addition, the advisory state associated with the HTTP request when in a first state indicates that it is necessary to obtain permission from the HTTP daemon in order to transmit the response data (e.g., response data stored in the HTTP cache) to the client and when in a second state indicates that the response data can be transmitted without obtaining permission from the HTTP daemon. For instance, the ADVISORY state may be initialized to FALSE indicating that an advisory upcall need not be performed in order to obtain permission from the HTTP daemon in order to transmit response data (e.g., response data that has previously been cached) to the client. The CTAG is an identifier associated with the response, enabling the response to be associated with multiple HTTP requests when stored in the HTTP cache. The door server thread then performs a door return returning to the upcall thread at block 610. The upcall thread that performed the door call via the upcall door resumes processing upon the door return and calls the cache manager with the HTTP request-response object as a parameter at block 612. Accordingly, through the specification and transmission of these caching attributes from the HTTP daemon to the cache manager, the web server can control the information that is transmitted to clients as well as the information that is stored in the HTTP cache.

Figure 7:
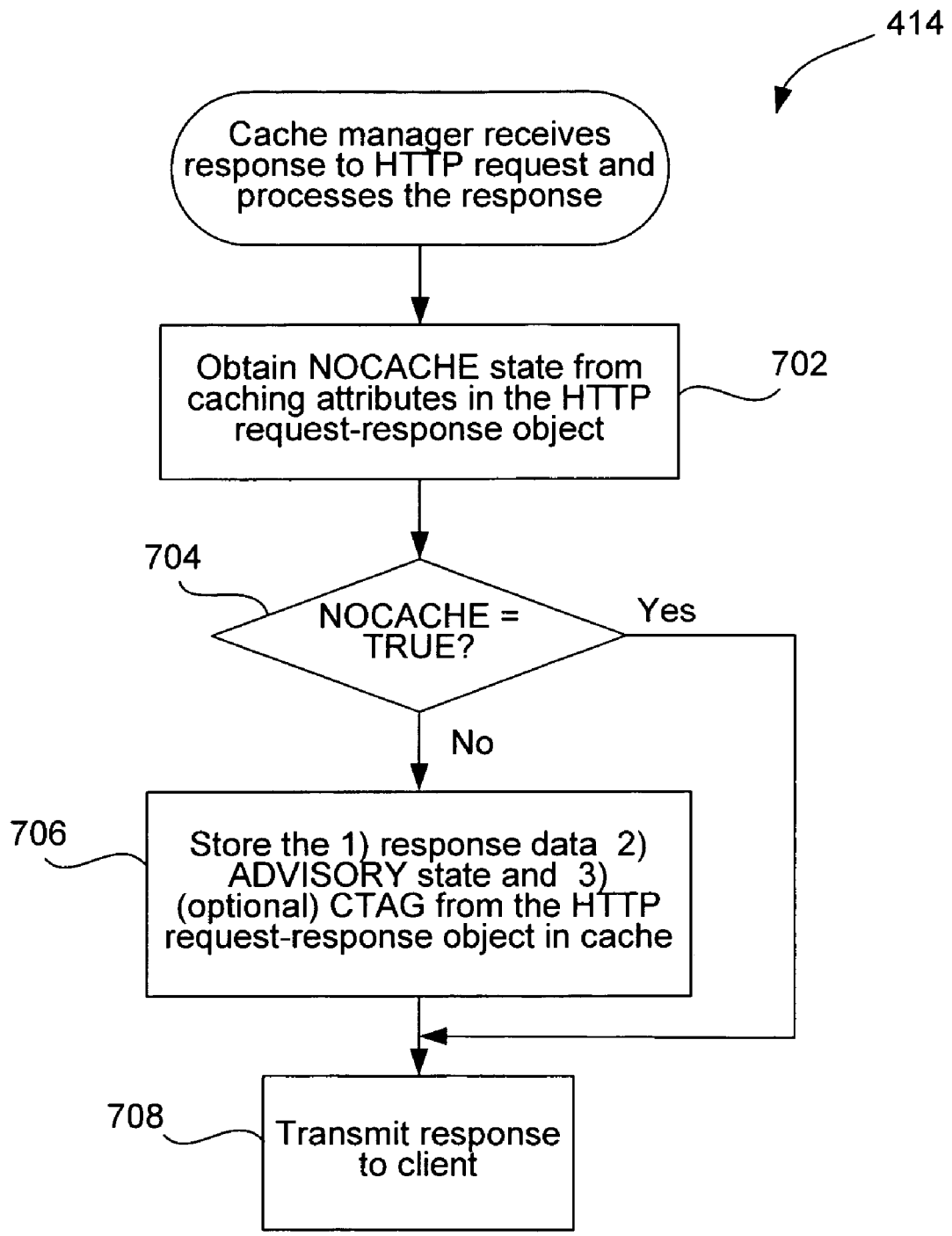
FIG. 7 is a process flow diagram illustrating a method of processing a response received by the cache manager as shown at block 414 of FIG. 4.

Since the response data was not stored in the cache, it may be desirable to store the current response data and associated information (e.g., one or more caching attributes) in the cache. FIG. 7 is a process flow diagram illustrating a method of processing a response received by the cache manager at shown at block 414 of FIG. 4. As shown at block 702, the NOCACHE state is obtained from the HTTP request-response object. If the NOCACHE state is not TRUE, the information is stored in the cache at block 706. More particularly, the response data is stored so that it may later be retrieved from the cache when a subsequent HTTP request is received. In addition, the ADVISORY state may be stored in the cache so that the cache manager may ascertain whether a cached object should be returned without obtaining permission from the HTTP daemon. Moreover, the CTAG may be stored in the cache so that multiple HTTP requests may be associated with a single response, thereby reducing the amount of memory required to store HTTP response data. If the NOCACHE state is TRUE, the information is not cached. Regardless of whether the information associated with the HTTP request is cached, the response data is transmitted to the client at block 708.

Figure 8:
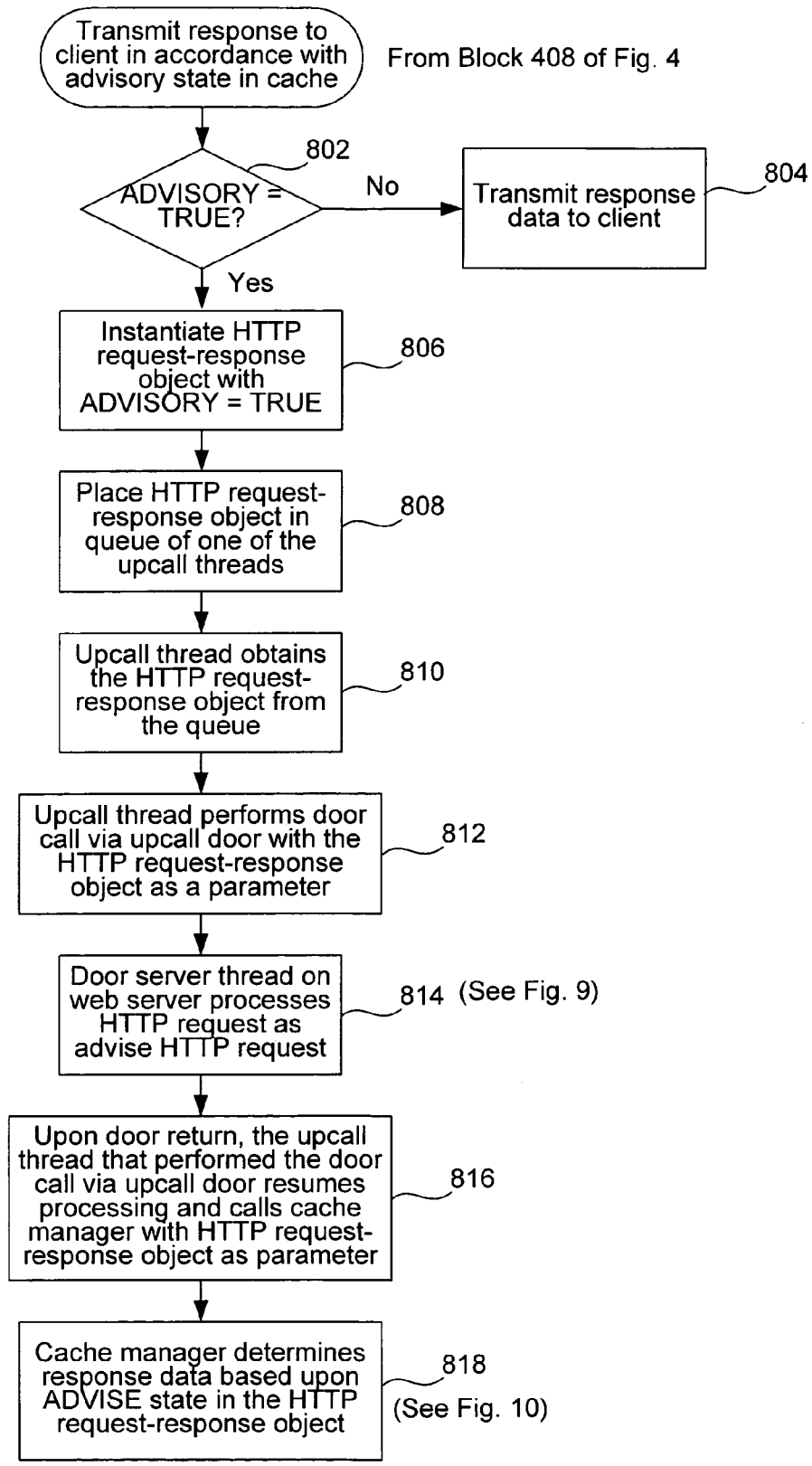
FIG. 8 is a process flow diagram illustrating a method of transmitting a response to a HTTP request in accordance with an advisory state associated with the HTTP request as shown at block 408 of FIG. 4.

As described above with reference to block 408 of FIG. 4, when the response data for a particular HTTP request is located in the HTTP cache, it may be desirable to consult with the web server (e.g., HTTP daemon) in order to ascertain whether the data in the cache is to be modified and/or whether the data is to be transmitted to the client submitting the HTTP request. FIG. 8 is a process flow diagram illustrating a method of transmitting a response to a HTTP request in accordance with an advisory state associated with the HTTP request as shown at block 408 of FIG. 4. At block 802 the cache manager determines whether the ADVISORY state indicates that the cache manager must consult with the web server (e.g., HTTP daemon) prior to transmitting the response data. For instance, when time sensitive information such as stock information is stored in the cache, it may be desirable to obtain permission from the HTTP daemon to transmit this potentially outdated information. If the cache manager is not required to consult with the HTTP daemon, the response data is transmitted to the client at block 804.

When the cache manager is required to consult with the web server prior to transmitting the response data, the cache manager sends an advisory request to the HTTP daemon in order to obtain an advise state from the HTTP daemon indicating an action to be taken with the response data. Thus, the cache manager instantiates a HTTP request-response object with the ADVISORY state equal to TRUE at block 806 indicating that advice from the HTTP daemon is requested. The HTTP request-response object is then placed in a queue of one of the upcall threads at block 808. The upcall thread eventually obtains the HTTP request-response object from the queue as shown at block 810. The upcall thread performs a door call via the upcall door with the HTTP request-response object as a parameter at block 812.

In accordance with one embodiment, when the cache manager requests permission to transmit HTTP response data, the HTTP daemon returns a cache advise state to control information that is stored in the HTTP cache as well as the information that is transmitted to a client. Thus, once the advisory request is received by the HTTP daemon, the door server thread processes the HTTP request as an advisory HTTP request at block 814 in order to return the advise state in the HTTP request-response object. One method of processing the advisory HTTP request will be described in further detail below with reference to FIG. 9. Upon door return, the upcall thread that performed the door call via the upcall door resumes processing and calls the cache manager with the HTTP request-response object as a parameter at block 816. The cache manager then determines the action to be taken with respect to the response data based upon the ADVISE state obtained from the HTTP request-response object at block 818 and performs this action. One method of transmitting the response data in accordance with the ADVISE state returned as a result of an advisory upcall is described below with reference to FIG. 10.

Figure 9:
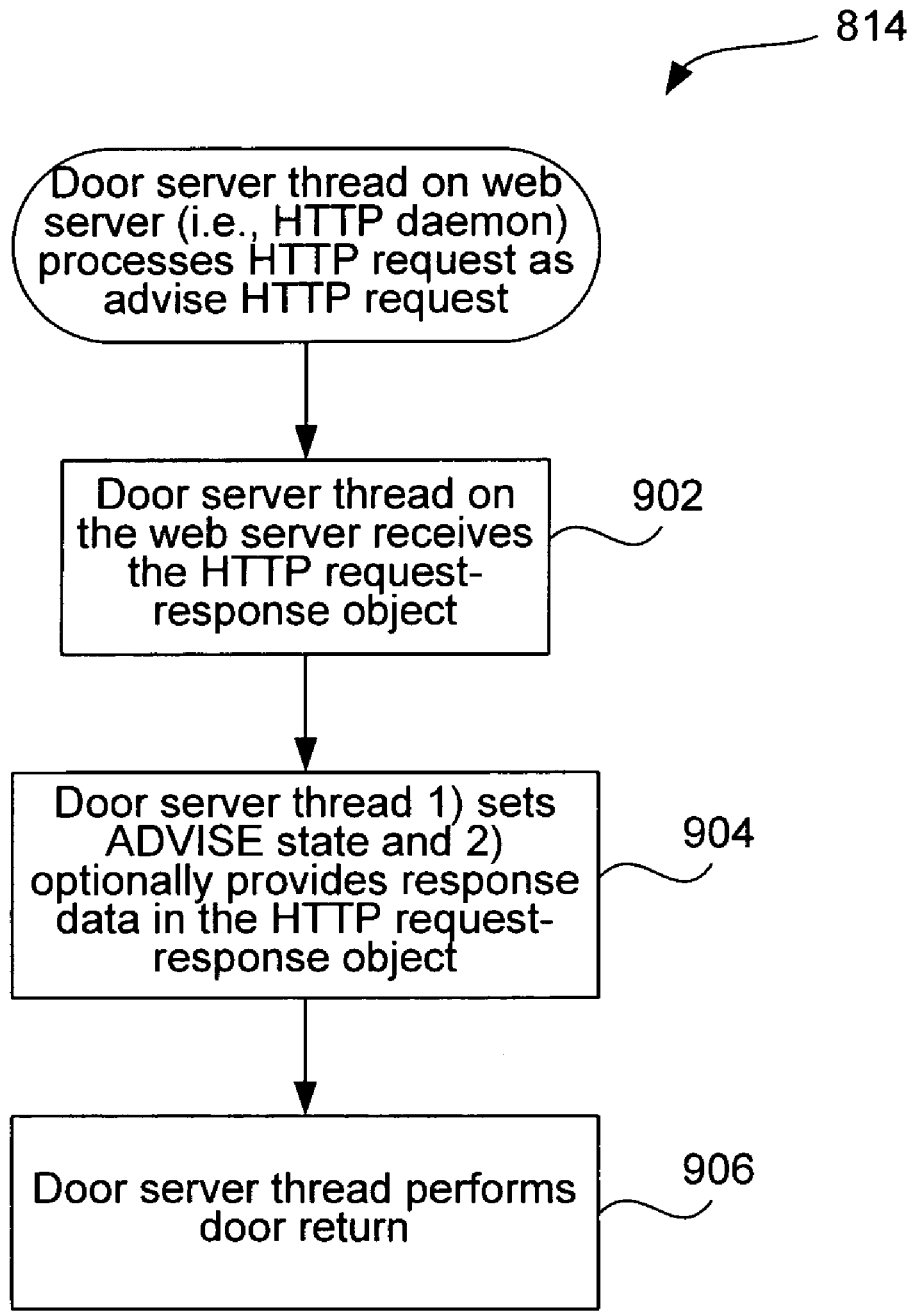
FIG. 9 is a process flow diagram illustrating a method of processing the HTTP request as an advisory HTTP request as shown at block 814 of FIG. 8.

FIG. 9 is a process flow diagram illustrating a method of processing the HTTP request as an advisory HTTP request as shown at block 814 of FIG. 8. The door server thread on the web server (i.e., HTTP daemon) receives the HTTP request-response object at block 902. The door server thread then sets the ADVISE state and optionally provides response data in the HTTP request-response object at block 904. The door server thread then performs a door return at block 906. In this manner, the HTTP daemon and therefore the web server may control the transmission of the response data as well as the information that is stored in the cache.

Figure 10:
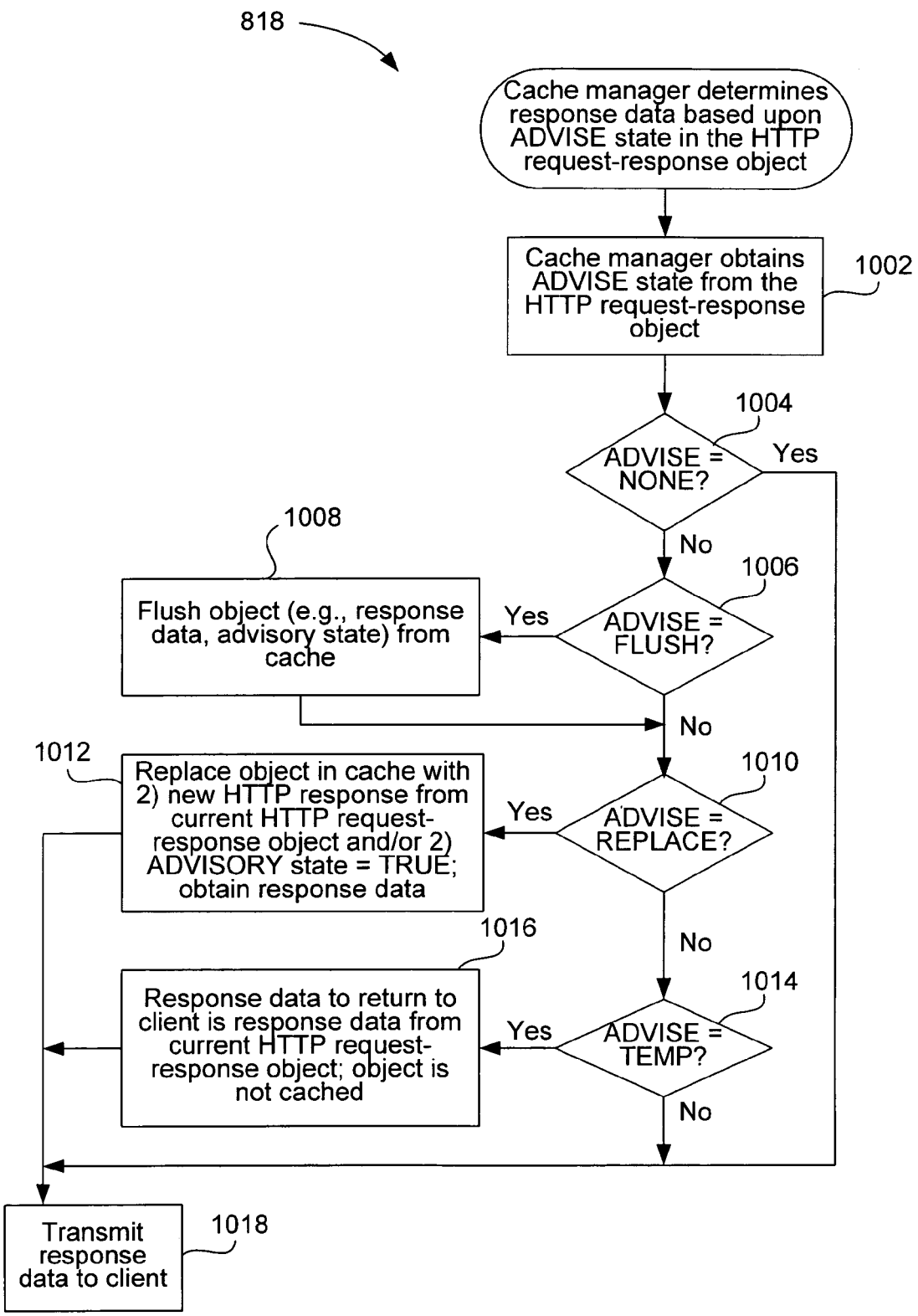
FIG. 10 is a process flow diagram illustrating a method of determining response data to the HTTP request based upon the ADVISE state associated with the HTTP request as shown at block 818 of FIG. 8.

FIG. 10 is a process flow diagram illustrating a method of manipulating response data to the HTTP request based upon the ADVISE state associated with the HTTP request as shown at block 818 of FIG. 8. As shown at block 1002, the cache manager obtains the ADVISE state from the HTTP request-response object and therefore from the HTTP daemon. Next, at block 1004, the cache manager determines whether the ADVISE state is equal to NONE. If the ADVISE state is equal to none, the response data may be transmitted without modifying the response data in the HTTP cache. The HTTP daemon may indicate that the data in the HTTP cache is to be modified by setting the ADVISE state to either FLUSH or REPLACE. As shown, the cache manager determines at block 1006 whether the ADVISE state is equal to FLUSH. If the ADVISE state is equal to FLUSH, the object associated with the HTTP request is flushed from the cache at block 1008. For instance, the response data and the advisory state may both be flushed through identifying the entry in the HTTP cache. If the cache manager determines at block 1010 that the ADVISE state is equal to REPLACE, the object associated with the HTTP request that is stored in the cache is replaced at block 1012 with a new HTTP response from the current HTTP request-response object and/or a new ADVISORY state. The response data that is transmitted to the client is therefore the current HTTP response. When the cache manager determines that the ADVISE state is equal to TEMP at block 1014, the response data from the current HTTP request-response object is considered a temporary response to be transmitted to the client and is therefore not cached at block 1016. In all instances, the response data is transmitted to the client at block 1018. The ADVISE states described are merely illustrative and may be used separately or in combination with one another.

Figure 11:
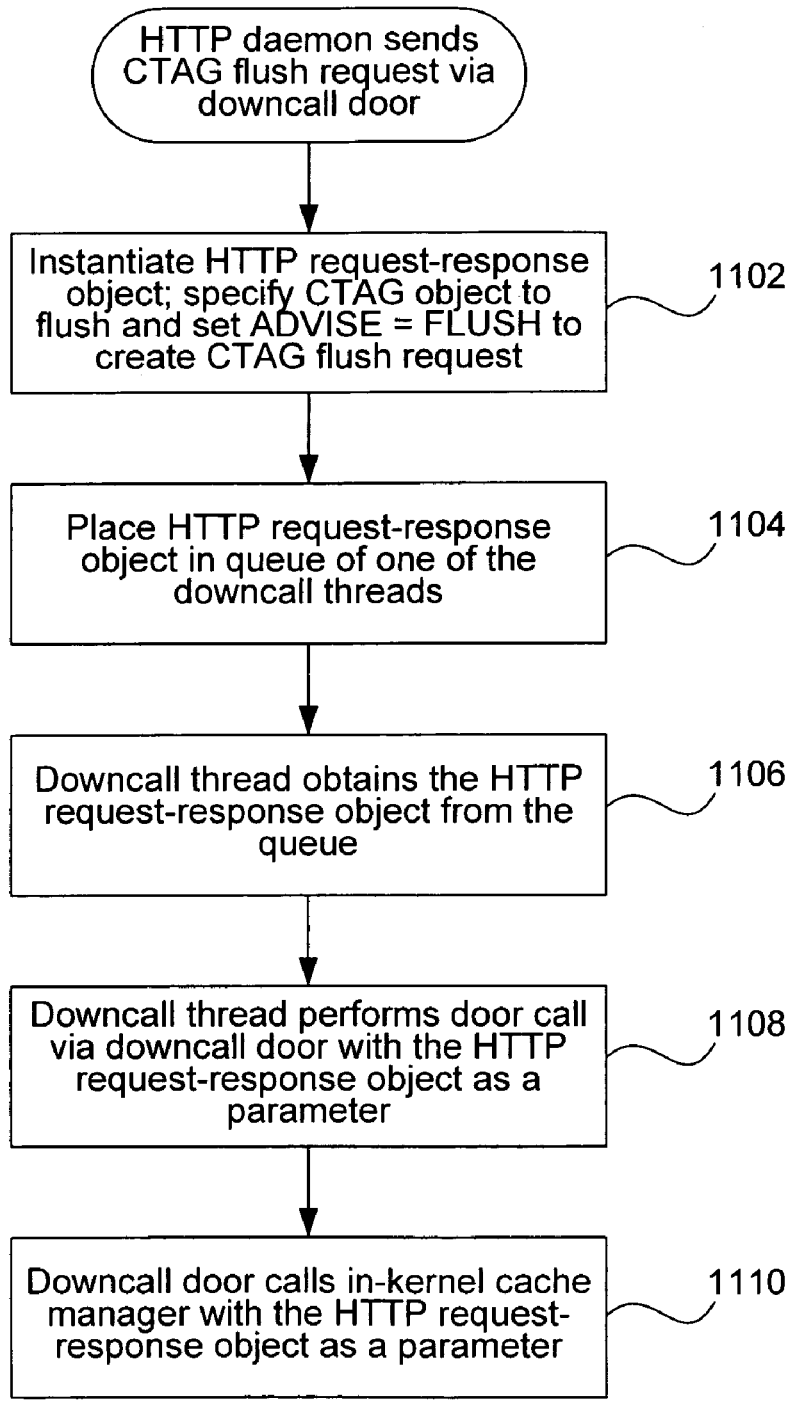
FIG. 11 is a process flow diagram illustrating a method of sending a cache request (e.g., flush request) to the cache manager in accordance with an embodiment of the invention.

As described above, the HTTP daemon may provide a response as well as caching attributes when a HTTP request is received from the cache manager. However, the HTTP daemon may also independently modify the data stored in the cache without initiation by the cache manager. FIG. 11 is a process flow diagram illustrating a method of sending a cache request (e.g., flush request) to the cache manager in accordance with an embodiment of the invention. In order to initiate a cache request, the HTTP daemon instantiates a HTTP request-response object. In the exemplary cache request, the HTTP daemon specifies an object to flush (e.g., via an identifier/CTAG) from the cache and sets the ADVISE state to FLUSH to create a flush request as shown at block 1102. The HTTP request-response object is then placed in a queue of one of the downcall threads at block 1104. The downcall thread eventually obtains the HTTP request-response object from the queue at block 1106 and the downcall thread performs a door call via the downcall door with the HTTP request-response object as a parameter at block 1108. The downcall door then calls the in-kernel cache manager with the HTTP request-response object as a parameter at block 1110. In this manner, the HTTP daemon sends a cache request (e.g., flush request) to the cache manager.

Figure 12:
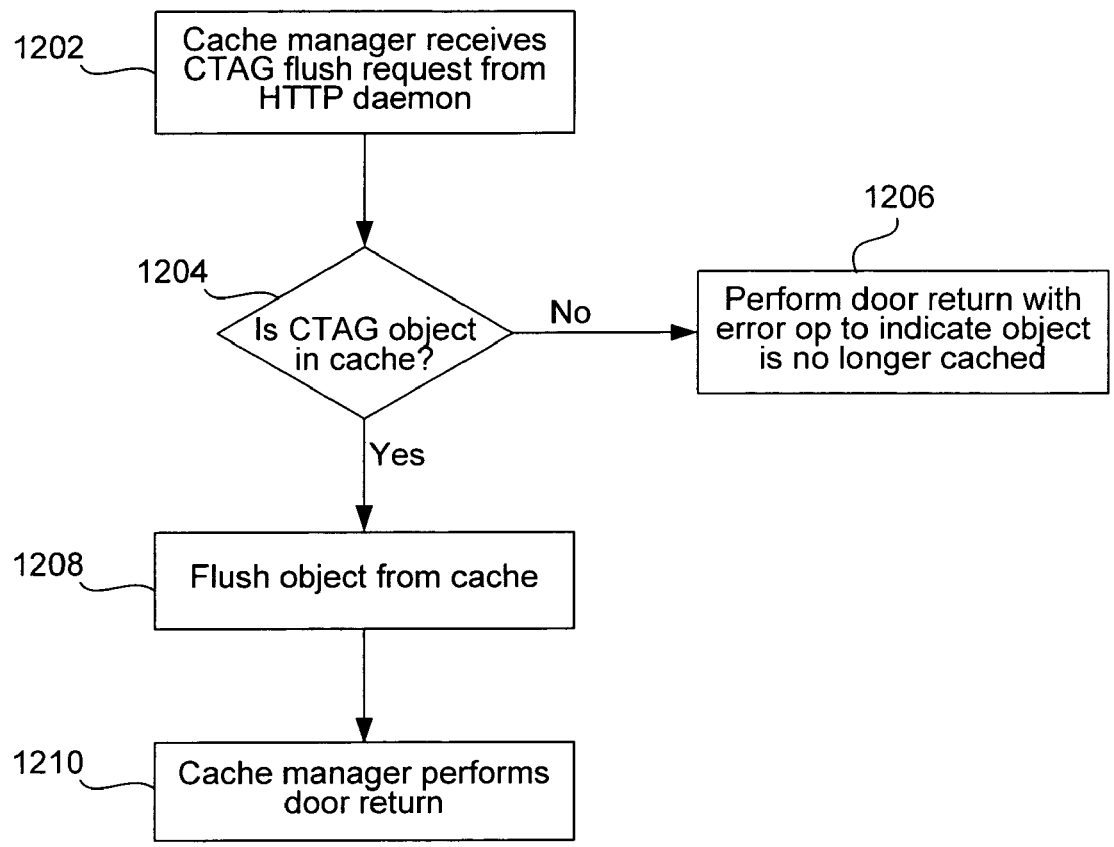
FIG. 12 is a process flow diagram illustrating a method of implementing a cache request (e.g., flush request) received by the cache manager in accordance with an embodiment of the invention.

Once the cache manager receives the cache request (e.g., flush request), the cache manager modifies the information stored in the HTTP cache in accordance with the cache request received from the HTTP daemon. FIG. 12 is a process flow diagram illustrating a method of implementing a cache request (e.g., flush request) received by the cache manager in accordance with an embodiment of the invention. The cache manager receives the flush request from the HTTP daemon at block 1202. If the object being flushed is determined not to be in the cache at block 1204, a door return is performed with an error code to indicate that the object is no longer cached as shown at block 1206. However, if the object is in the cache, the object (e.g., ADVISORY state, response data, CTAG identifier) is flushed from the cache at block 1208 and the cache manager performs a door return at block 1210. In this embodiment, both the cache manager and the HTTP cache are in the kernel of the web server.

Figure 13:
FIG. 13 is a block diagram illustrating an exemplary in-kernel cache that may be implemented in accordance with an embodiment of the invention.

FIG. 13 is a block diagram illustrating an exemplary in-kernel cache that may be implemented in accordance with an embodiment of the invention. As shown, the in-kernel cache may store a plurality of entries associated with multiple HTTP requests. Each entry may specify a HTTP request name 1302 specified by the HTTP request, response data 1304, an advisory state 1306, and a CTAG identifier 1308. As shown, the CTAG identifier 1308 may identify a response object (e.g., stored in secondary storage). In this manner, the response data may be cached with reduced memory consumption.

Figure 14:
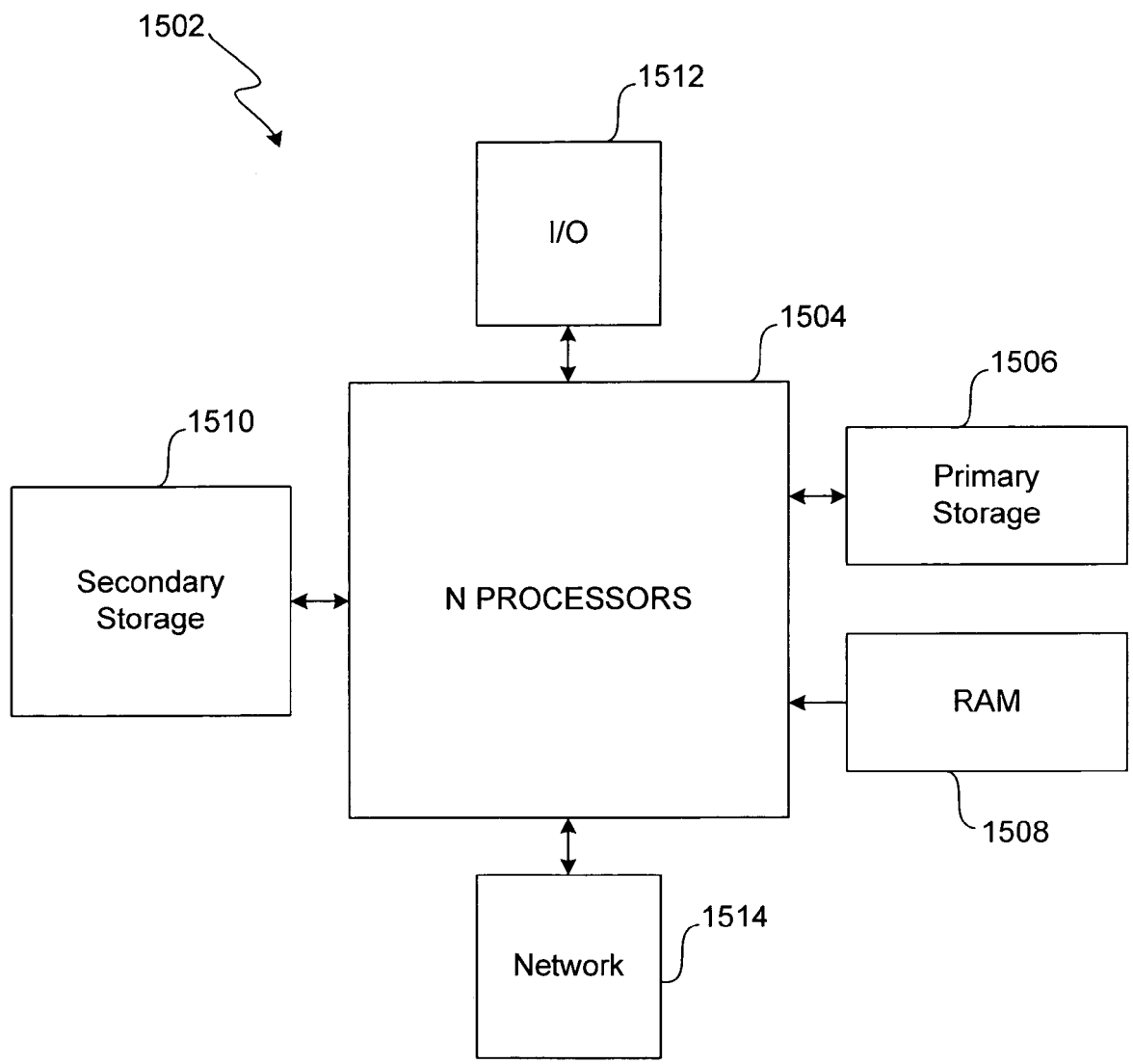
FIG. 14 is a block diagram illustrating a typical, general-purpose computer system suitable for implementing the present invention.

The present invention may be implemented on any suitable computer system. FIG. 14 illustrates a typical, general-purpose computer system 1502 suitable for implementing the present invention. The computer system may take any suitable form.

Computer system 1530 or, more specifically, CPUs 1532, maybe arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented in a web server. However, the present invention may be used in other contexts. Moreover, the above described process blocks are illustrative only. Therefore, the implementation of the cache manager and HTTP daemon may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of managing an in-kernel HTTP cache in a web server, comprising:
   receiving a request;
   determining whether response data associated with the HTTP request is in the in-kernel HTTP cache;
   when it is determined that response data associated with the HTTP request is in the in-kernel HTTP cache, obtaining an advisory state associated with the HTTP request from the in-kernel HTTP cache, the advisory state when in a first state indicating that it is necessary to obtain permission from a HTTP daemon to determine whether the response data can be transmitted and when in a second state indicating that the response data can be transmitted without obtaining permission from the HTTP daemon; and transmitting the response data in accordance with the advisory state associated with the HTTP request.

2. The method as recited in claim 1, wherein transmitting the response data in accordance with the advisory state associated with the HTTP request comprises:

when the advisory state is in the first state, sending an advisory request to the HTTP daemon, the advisory request requesting an advise state from the HTTP daemon indicating an action to be taken with the response data, and receiving the advise state from the HTTP daemon.

3. The method as recited in claim 2, wherein transmitting the response data in accordance with the advisory state associated with the HTTP request when the advisory state is in the first state further comprises:

transmitting the response data without modifying the response data in the in-kernel HTTP cache when the advise state is in a first state.

4. The method recited in claim 2, wherein transmitting the response data in accordance with the advisory state associated with the HTTP request when the advisory state is in the first state further comprises:

modifying the response data stored in the in-kernel HTTP cache as specified by the advise state.

5. The method as recited in claim 4, wherein modifying the response data comprises:

removing at least one of the response data and the advisory state from the in-kernel HTTP cache when the advise state is in a second state.

6. The method as recited in claim 4, wherein modifying the response data comprises:

receiving second response data from the HTTP daemon; and performing at least one of replacing the response data in the in-kernel HTTP cache with the second response data and replacing the advisory state in the in-kernel HTTP cache with a second advisory state when the advise state is in a third state.

7. The method as recited in claim 2, wherein transmitting the response data in accordance with the advisory state associated with the HTTP request when the advisory state is in the first state further comprises:

receiving second response data from the HTTP daemon; and transmitting the second response data when the advise state is in a fourth state without transmitting the response data in the in-kernel HTTP cache and without storing the second response data in the in-kernel HTTP cache.

8. A computer-readable medium for managing an in-kernel HTTP cache in a web server, the computer-readable medium storing computer-readable instructions thereon, comprising:

instructions for receiving a HTTP request;

instructions for determining whether response data associated with the HTTP request is in the in-kernel HTTP cache;

instructions for when it is determined that response data associated with the HTTP request is in the in-kernel HTTP cache, obtaining an advisory state associated with the HTTP request from the in-kernel HTTP cache, the advisory state when in a first state indicating that it is necessary to obtain permission from a HTTP daemon to determine whether the response data can be transmitted and when in a second state indicating that the response data can be transmitted without obtaining permission from the HTTP daemon; and instructions for transmitting the response data in accordance with the advisory state associated with the HTTP request.

9. An apparatus for managing an in-kernel HTTP cache in a web server, comprising:

means for receiving a HTTP request;

means for determining whether response data associated with the HTTP request is in the in-kernel HTTP cache;

means for when it is determined that response data associated with the HTTP request is in the in-kernel HTTP cache, obtaining an advisory state associated with the HTTP request from the in-kernel HTTP cache, the advisory state when in a first state indicating that it is necessary to obtain permission from a HTTP daemon to determine whether the response data can be transmitted and when in a second state indicating that the response data can be transmitted without obtaining permission from the HTTP daemon; and means for transmitting the response data in accordance with the advisory state associated with the HTTP request.

10. An apparatus for managing an in-kernel HTTP cache in a web server, comprising:

a processor; and a memory, at least one of the processor and the memory being adapted for:

receiving a HTTP request;

determining whether response data associated with the HTTP request is in the in-kernel HTTP cache;

when it is determined that response data associated with the HTTP request is in the in-kernel HTTP cache, obtaining an advisory state associated with HTTP request from the in-kernel HTTP cache, the advisory state when in a first state indicating that it is necessary to obtain permission from a HTTP daemon to determine whether the response data can be transmitted and when in a second state indicating that the response data can be transmitted without obtaining permission from the HTTP daemon; and transmitting the response data in accordance with the advisory state associated with the HTTP request.

* * * * *

UNITED STATES PATENT AND TRADEMARK OFFICE
CERTIFICATE OF CORRECTION

PATENT NO. : 6,934,761 B1
DATED : August 23, 2005
INVENTOR(S) : Bruce W. Curtis

It is certified that error appears in the above-identified patent and that said Letters Patent is hereby corrected as shown below:

Column 7,
Line 21, change "manager at shown" to -- manager as shown --.

Column 10,
Line 60, change "a request" to -- a HTTP request --.

Column 11,
Line 24, change "method recited" to -- method as recited --.

Column 12,
Line 47, change "with HTTP" to -- with the HTTP --.

Signed and Sealed this

Third Day of January, 2006

JON W. DUDAS
*Director of the United States Patent and Trademark Office*